(12) United States Patent
Smith

(10) Patent No.: US 7,325,234 B2
(45) Date of Patent: Jan. 29, 2008

(54) SYSTEM AND METHOD FOR MONITORING COMPUTER APPLICATION AND RESOURCE UTILIZATION

(75) Inventor: David Wesley Smith, Bridgeport, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 560 days.

(21) Appl. No.: 10/077,372

(22) Filed: Feb. 15, 2002

(65) Prior Publication Data

US 2002/0178206 A1 Nov. 28, 2002

Related U.S. Application Data

(60) Provisional application No. 60/293,685, filed on May 25, 2001.

(51) Int. Cl.
G06F 9/46 (2006.01)
G06F 15/173 (2006.01)
G06F 15/177 (2006.01)
G06F 3/00 (2006.01)

(52) U.S. Cl. .................. 718/104; 709/223; 709/224; 709/225; 709/226; 715/733; 715/736

(58) Field of Classification Search ........ 718/100–108; 709/229, 223–226; 715/733–736
See application file for complete search history.

(56) References Cited

U.S. PATENT DOCUMENTS

| | | | |
|---|---|---|---|
| 4,481,583 A | 11/1984 | Mueller | 364/300 |
| 4,780,821 A | 10/1988 | Crossley | 364/200 |
| 4,796,181 A | 1/1989 | Wiedemer et al. | 364/406 |
| 5,023,907 A | 6/1991 | Johnson et al. | 380/4 |
| 5,553,239 A | 9/1996 | Heath et al. | 395/187 |
| 5,694,549 A | 12/1997 | Carlin et al. | 395/200 |
| 5,758,069 A | 5/1998 | Olsen | |
| 5,930,773 A | 7/1999 | Crooks et al. | 705/30 |
| 5,949,415 A | 9/1999 | Lin et al. | 345/335 |

(Continued)

FOREIGN PATENT DOCUMENTS

EP 0 501 076 A 9/1992

OTHER PUBLICATIONS

"AIX Version 3.2—System Management Guide: Operating System and Devices, Chapter 14 System Accounting" Oct. 1, 1993 pp. 14-1-14-29 XP002067192 Abstract.

(Continued)

Primary Examiner—Meng-Al T. An
Assistant Examiner—Jennifer N. To
(74) Attorney, Agent, or Firm—Alexander J. Burke

(57) ABSTRACT

A system and a method for monitoring computer application and resource utilization are presented. In one embodiment, a list of different users associated with different entities or customers of a shared computer is maintained. A second list of different applications invoked by one or more of the different users is also maintained. A third list including different programs employed by the different applications invoked by the different users, including a weighting factor for each program is also maintained. These records are then used to identify operation usage and/or cost characteristics of the different applications by particular users associated with different entities of the shared computer, in response to an event.

18 Claims, 14 Drawing Sheets

U.S. PATENT DOCUMENTS

| | | | |
|---|---|---|---|
| 6,202,199 B1 | 3/2001 | Wydogny et al. | 717/4 |
| 6,230,204 B1* | 5/2001 | Fleming, III | 709/229 |
| 6,249,802 B1 | 6/2001 | Richardson et al. | 709/200 |
| 6,282,701 B1 | 8/2001 | Wydogny et al. | 717/4 |
| 6,643,696 B2* | 11/2003 | Davis et al. | 709/224 |
| 7,120,715 B2* | 10/2006 | Chauvel et al. | 710/244 |
| 7,167,915 B2* | 1/2007 | Bendich et al. | 709/224 |
| 7,188,170 B1* | 3/2007 | Burnley et al. | 709/224 |
| 2002/0174220 A1* | 11/2002 | Johnson | 709/224 |
| 2007/0061450 A1* | 3/2007 | Burnley et al. | 709/224 |

OTHER PUBLICATIONS

International Search Report.

Alan Rdding, "the Much Talked About, Often Disparaged, but increasingly Evident ASP Threat," Sep. 2000, Consulting Magazine (as appeared on www.consultingcentral.com).

Larry Simmons, "Extending Legacy to the Internet—transforming Maianframe Applications," 1999, www.simotime.com.

* cited by examiner

|  | Costing Data Size | | | |
|---|---|---|---|---|
|  | Large | Medium | Small | |
| Max | 45,000 | 20,000 | 10,000 | |
| Min | 15,000 | 11,000 | 3,000 | |
| 80 byte/hr | 3,600,000 | 1,600,000 | 800,000 | max. total |
| 96 byte/hr | 4,320,000 | 1,920,000 | 960,000 | data size |
| 160 byte/hr | 7,200,000 | 3,200,000 | 1,600,000 | per hr |
| 80 byte/hr | 28,800,000 | 12,800,000 | 6,400,000 | max. total |
| 96 byte/hr | 34,560,000 | 15,360,000 | 7,680,000 | data size |
| 160 byte/hr | 57,600,000 | 25,600,000 | 12,800,000 | per 8 hrs |
| 80 byte/hr | 86,400,000 | 38,400,000 | 19,200,000 | max. total |
| 96 byte/hr | 103,680,000 | 46,080,000 | 23,040,000 | data size |
| 160 byte/hr | 172,800,000 | 76,800,000 | 38,400,000 | per 24 hrs |

Notes:
1. large sample was not for a super large customer or entity
2. 80 bytes provided CPU statistic only
3. 96 bytes provided CPU, file, TS (temporary storage) etc. overviews
4. 160 bytes provided CPU and detailed fields
5. using all CMF fields would require 350+ bytes Prior Art
Fig. 2

Application / Cost List

Header/Control info..

| | 457 | 458 | 459 |
|---|---|---|---|
| Cust1/Appl1 | Criteria Stats | Performance Stats | |
| Cust1/Appl2 | Criteria Stats | Performance Stats | |
| ... | | | |
| Cust1/Appln | Criteria Stats | Performance Stats | |
| ... | | | |
| CustX/Appln | Criteria Stats | Performance Stats | |

⟶ 451

Report Generation List

Links to statistics captured in the ACL.
Followed by reporting criteria (hourly, daily)
and the output mechanism (file, SMF etc..)

⟶ 452

Application / Statistical Definition List

Maps specific statistical reporting criteria
to the actual data collection mechanism
provided by the online system.

⟶ 453

Program Buffer Pool

Provides an MRU pooling construct to keep APL
list searching to a minimum. Has pointers to
the APL and TAL constructs.

```
PATH   : APEX\DISPLAY\APPLICATION_RESOURCE_USAGE
STATUS: ACTIVE SINCE 01127 00:54:46    CURRENT:  01131 14:40:20

APPLICATION   TOTAL CPU TIME        TOTAL FILE REQUESTS   TOTAL TS REQUESTS
-----------------------------------------------------------------------------
_  APS         00:00:00.00000              0                    0
_  BNS         00:00:00.00000              0                    0
_  CHT         00:00:00.00000              0                    0
_  CIC—637     00:00:01.37152          3,595                5,213
_  CMA         00:00:00.00446              7                    4
_  CMF         00:00:00.00000              0                    0
_  CRM         00:00:00.22608          1,434                  305
_  CWS         00:00:00.01048             32                   11
_  GDI         00:00:00.09080            272                  106
_  GLS   631   00:00:00.00000   632      0    633        0    634
_  HRS         00:00:00.00000              0                    0
_  IBS         00:00:00.00000              0                    0
_  MML         00:00:01.70035          1,037                  951
_  MRS         00:00:00.04868            124                   16
_  NDB         00:00:00.01678             52                    4
_      MORE->
_  TOTALS      00:00:16.73848         69,482               18,750
-----------------------------------------------------------------------------
     <PF3>:RETURN   <PF5>:VIEW %           <PF8>:DOWN   SELECT FOR DETAILS
                                                                  ↘630
```

Fig. 6C

```
PATH   : APEX\DISPLAY\APPLICATION_RESOURCE_BY_%
STATUS: ACTIVE SINCE 01127 00:54:46    CURRENT:  01131 14:40:44

APPLICATION   TOTAL CPU TIME        TOTAL FILE REQUESTS   TOTAL TS REQUESTS
-----------------------------------------------------------------------------
..  APS
_   BNS
_   CHT
_   CIC         08.15%                  05.16%               27.69%
_   CMA         00.02%                  00.01%               00.02%
_   CMF
_   CRM         01.34%                  02.05%               01.62%
_   CWS         00.06%                  00.04%               00.05%
_   GDI         00.54%                  00.39%               00.56%
_   GLS
_   HRS
_   IBS
_   MML         10.14%                  01.49%               05.07%
_   MRS         00.28%                  00.17%               00.08%
_   NDB         00.09%                  00.07%               00.02%
_       MORE->
_   TOTALS     100.00%                 100.00%              100.00%
-----------------------------------------------------------------------------
     <PF3>:RETURN   <PF5>:VIEW #           <PF8>:DOWN   SELECT FOR DETAILS
                                                                  ↘640
```

Fig. 6D

```
PATH  : APEX\DISPLAY\APPLICATION_RESOURCE_USAGE
STATUS: ACTIVE SINCE 01127 00:54:46   CURRENT:  01131 14:41:40

HHRR CODE: LGNU                       APPLICATION:  CIC

STATISTIC              VALUE          STATISTIC              VALUE
------------------------------------------------------------------
TTL ALLOC REQ          3,663          MAX USER  STG USED    133,264
MAX USER  STG USED    53,632          MAX CDSA STG USED       5,664
MAX ECDSA STG USED     6,320          MAX PGM STG (TTL)     510,152
MAX 16M+ PGMSTG USED 404,496          MAX 16M- PGMSTG USED  118,936
FILE READ REQUESTS     2,010          FILE WRITE REQUESTS        90
FILE BROWSE REQUESTS     256   651    FILE ADD REQUESTS  652    745
FILE DELETE REQUESTS     188          TOTAL FILE REQUESTS     3,687
TOTAL FILE ACC.I/F     4,939          TOTAL TD REQUESTS       1,473
TS GET REQUESTS        3,036          TS-AUX PUT REQUESTS     2,210
TS-MAIN PUT REQUESTS       0          TOTAL TS REQUESTS       5,246
PROGRAM LINK REQ.      3,187          PROGRAM XCTL REQ.         109
JOURNAL OUTPUT REQ.      110          TTL DISP TIME    00:00:04.34664
TOTAL CPU TIME   00:00:01.40385       TTL SUSP TIME    00:00:55.66921
T TERM I/O WTIME 00:00:14.53320       TTL FI I/O WTIME 00:00:11.71616
TTL JC I/O WTIME 00:00:00.96356       TTL TS I/O WTIME 00:00:00.20697
------------------------------------------------------------------
              <PF3>:EXIT
```

Fig. 6E  650

```
PATH  : APEX\ACTIVITY
STATUS: ACTIVE SINCE 01127 00:54:46   CURRENT:  01131 14:43:48
------------------------------------------------------------------

1. PROGRAM-APPLICATION MASK LIST

2. CURRENT TASK-ACTIVITY

3. LAST ACTIVE... (PGMS,TRNS,TSKS)

4. APPLICATION ACTIVITY STATISTICS

5. MISCELLANEOUS

0. RETURN

SELECT AN OPTION:  3  AND PRESS <ENTER>
------------------------------------------------------------------
              <PF3>:EXIT
```

Fig. 7

```
PATH    : APEX\ACTIVITY\PROGRAM-APPLICATION_MASK_LIST
STATUS: ACTIVE SINCE 01127 00:54:46    CURRENT:   01131 14:44:16

TOTAL REFERENCES :    3,486,617                                    PAGE :   1

PROGRAM / APPL    COUNT      WT      PROGRAM / APPL    COUNT       WT
-----------------------------------------------------------------------------
A2000PCL  MRS     33,948     80      A2000PHP  IBS         0       80
A2000TCL  NSS          0     80      A2000TMF  IBS         0       80
A2000TRV  URS          0     80      GAHHRRSW  PAS         0       80
REPTSIGN  SCH        170     80      SMS#NDBE  NDB         0        1
A2000L7*  OPS          0     80      A2000M7*  OPS         0       80
A2000PX*  RXS          0     80      A2000P7*  OPS         0       80
A2000TX*  RXS          0     80      PETPARS*  PET         0       80
BCF*****  CIC          0     80      CDO*****  EAD         0       80
CIX*****  NDB      8,162      1      DFH*****  CIC    41,377        1
DRG*****  CMA          0     80      GAA*****  APS         0       80
GAF*****  PAM          0     80      GAH*****  HRS         0       80
GAX*****  PAS          0     80      HDO*****  EAD         0       80
MAS*****  PMS          0     80      NDB*****  NDB   120,362        1
OIO*****  EAD          0     80      PDF*****  OAS         0       10
PFO*****  PMS      1,253     80      PQO*****  HRS         0       80
-----------------------------------------------------------------------------
        <PF3>:EXIT                                        <PF8>:DOWN
```

Fig. 8

```
PATH    : APEX\ACTIVITY\LAST_ACTIVE\PROGRAMS
STATUS: ACTIVE SINCE 01127 00:54:46    CURRENT:   01131 14:44:45

LAST 100 REFERENCES
-------------------
  1-CHPPPG01    2-CHPPPG01    3-CHPPPG01    4-CHPPPG01    5-CHPPPG01    6-CHPPPG01
  7-CHPPPG01    8-CHPPPG01    9-PA201100   10-PA201400   11-CHPPPG01   12-CHPPPAGE
 13-CHPPMAIN   14-CIACZDSL   15-CITMFATD   16-DFHZCQ     17-DFHZATD    18-CIMMROUT
 19-CINEPRCO   20-CISISERV   21-CISISERV   22-CISISERV   23-CISISERV   24-CIGOJASU
 25-CIXVSIGN   26-CINEPSMS   27-DFHZNEP    28-DFHSFP     29-CIFPLOGO   30-CHPPPG01
 31-CHPPPAGE   32-CHPPPG01   33-CHPPPG01   34-CHPPPG01   35-NDBLDPC    36-CHPPAPID
 37-CHPPMAIN   38-CISMSMAS   39-CIFPUCON   40-CHPPSIOF   41-CIMMROUT   42-CHPPXENQ
 43-CHPPXENQ   44-CHPPSYLG   45-CIFPUCON   46-CHPPSYSO   47-CHPPSION   48-CHPPPG01
 49-CHPPPG01   50-CHPPPG01   51-CHPPPG01   52-CHPPPG01   53-CHPPPG01   54-CHPPPG01
 55-CHPPPG01   56-PA201100   57-PA201400   58-CHPPMAIN   59-CHPPSYCP   60-CHPPSYCP
 61-CHPPPG01   62-CHPPPG01   63-CICSAUTH   64-CHPPCWAC   65-CHPPGTNN   66-PA200000
 67-CICSAUTH   68-CHPPCWAC   69-CHPPGTNN   70-PA201900   71-CHPPMAIN   72-CHPPCCON
 73-CHPPSYSO   74-CHPPSION   75-CHPPMAIN   76-CHPPMAIN   77-CHPPMAIN   78-CHPPPG01
 79-CHPPPG01   80-CHPPPG01   81-CHPPPG01   82-CHPPPG01   83-CHPPPG01   84-CHPPPG01
 85-CHPPPG01   86-PA201100   87-PA201400   88-CHPPMAIN   89-CHPPSYCP   90-CHPPMAIN
 91-CHPPCCON   92-CHPPSION   93-CHPPMAIN   94-CIFPUCON   95-CHPPC001   96-CIMMROUT
 97-CHPPXENQ   98-CHPPXENQ   99-CHPPSYLG  100-NDBLDPC
-------------------------------------------------------------------------------
        <PF3>:EXIT                    <PF5>:VIEW TASK/TRAN
```

Fig. 9

```
PATH   : APEX\ACTIVITY\APPLICATION_ACTIVITY_STATISTICS
STATUS: ACTIVE SINCE 01127 00:54:46    CURRENT:  01131 14:45:06

RECS PROCSD/TOTAL:      383,008 /    387,452   CLOSE WEIGHT:          2

APPLICATION   TOTAL   SWEEP   CLOSE     APPLICATION   TOTAL   SWEEP   CLOSE
-------------------------------------------------------------------------
LONU-APS      2,117       0       0     LONU-BNS          0       0       0
LONU-CHT          0       0       0     LONU-CIC     76,015       0   1,946
LONU-CMA         70       0       0     LONU-CMF          0       0       0
LONU-CRM      2,707      12       0     LONU-CWS        377     377     377
LONU-GDI      6,252       9       1     LONU-GLS        806     166       1
LONU-HRS          0       0       0     LONU-IBS          0       0       0
LONU-MML     19,205   5,693   1,384     LONU-MRS        484      56       6
LONU-NDB        118       7      78     LONU-NSS          0       0       0
LONU-OAS    148,644   4,092  67,794     LONU-OPS     17,585  17,585     175
LONU-PAM          0       0       0     LONU-PAS     46,624  46,622  17,633
LONU-PET          0       0       0     LONU-PMS     59,484  59,477   1,789
LONU-ROC          0       0       0     LONU-RRS          0       0       0
LONU-RSS        241     241       0     LONU-RXS      2,051   2,051   1,182
LONU-SCH        212     212     121     LONU-URS          2       2       0
LONU-EAD          0       0       0     LONU-UKN         14       1       0
-------------------------------------------------------------------------
      <PF3>:EXIT    <PF5>:VIEW PATH LENGTH
```

Fig. 10

```
PATH   : APEX\ACTIVITY\APPLICATION_ACTIVITY_STATISTICS
STATUS: ACTIVE SINCE 01127 00:54:46    CURRENT:  01131 14:45:33

RECS PROCSD/TOTAL:      383,052 /    387,496   CLOSE WEIGHT:          2

APPLICATION   AVG.    MIN.    MAX.      APPLICATION   AVG.    MIN.    MAX.
-------------------------------------------------------------------------
LONU-APS      12.5       2   1,097     LONU-BNS        0.0       0       0
LONU-CHT       0.0       0       0     LONU-CIC        3.3       1   1,870
LONU-CMA      15.0       4     447     LONU-CMF        0.0       0       0
LONU-CRM      38.3       2     446     LONU-CWS        5.0       4       7
LONU-GDI      14.0       1      42     LONU-GLS       19.9       2     240
LONU-HRS       0.0       0       0     LONU-IBS        0.0       0       0
LONU-MML       7.6       1     218     LONU-MRS       84.7       3     270
LONU-NDB      33.4       1     758     LONU-NSS        0.0       0       0
LONU-OAS      20.7       1   2,928     LONU-OPS       14.5       2     315
LONU-PAM       0.0       0       0     LONU-PAS       12.4       1     156
LONU-PET       0.0       0       0     LONU-PMS       13.8       1   3,165
LONU-ROC       0.0       0       0     LONU-RRS        0.0       0       0
LONU-RSS       5.0       5       6     LONU-RXS        7.2       2      42
LONU-SCH       2.8       2      35     LONU-URS       14.0      11      17
LONU-EAD       0.0       0       0     LONU-UKN        1.0       1       2
-------------------------------------------------------------------------
      <PF3>:EXIT    <PF5>:VIEW STATISTICS
```

Fig. 11

```
PATH   : APEX\ACTIVITY\MISCELLANEOUS
STATUS : ACTIVE SINCE 01127 00:54:46     CURRENT:  01131 14:46:02
-------------------------------------------------------------------

1. BUFFER STATISTICS

*. MULTI-CLIENT ACTIVITY

0. RETURN

SELECT AN OPTION:      AND PRESS <ENTER>
-------------------------------------------------------------------
         <PF3>:EXIT
```

Fig. 12

```
PATH   : APEX\ACTIVITY\MISCELLANEOUS\BUFFER_STATISTICS
STATUS : ACTIVE SINCE 01127 00:54:46     CURRENT:  01131 14:46:33

BUFFERS:           21   TTL HITS:   2,837,723   TTL ADDS:      650,544

HIT-PGM  RULEBASE  TTL-HITS  TTL-REFS   HIT-PGM  RULEBASE  TTL-HITS  TTL-REFS
-----------------------------------------------------------------------------
CHPPSYCP    MISC    485,333   730,621   CIACZDSM  CI*****   191,492   259,191
CHPPMAIN  CHPPMAIN  234,559   239,925   PA201100  PA*****    79,245   118,826
CHPPCCON    MISC    485,333   730,621   PA201400  PA*****    79,245   118,826
CHPPSION    MISC    485,333   730,621   CICSAUTH  CI*****   191,492   259,191
CHPPPG01  CHPPPG01  301,420   307,381   PA201800  PA*****    79,245   118,826
CHPPCWAC  CHPPCWAC  215,365   220,529   PA200000  PA*****    79,245   118,826
CHPPGTNN  CHPPGTNN  104,494   114,022   CIFPUCOF  CI*****   191,492   259,191
CHPPPAGE  CHPPPAGE   60,752    67,194   PA221700  PA*****    79,245   118,826
CHPPCSUP    MISC    485,333   730,621   DFHGMM    DFH****    18,519    41,438
CHPPTIME    MISC    485,333   730,621   CISISERV  CI*****   191,492   259,191
CHPPNNIM  CHPPNNIM      400     3,829   CIFPUTSI  CI*****   191,492   259,191
CHPPNNEH  CHPPNNEH      390     3,794   CIFPGMM   CI*****   191,492   259,191
CHPPOP50  CHPPOP**   21,374    45,002   CIONCSAC  CI*****   191,492   259,191
CHPPOP10  CHPPOP**   21,374    45,002   CIXVSIGN  CIX****     3,688     8,176
CHPPXENQ  CHPPXENQ  408,190   413,554   CIMMROUT  CI*****   191,492   259,191
-----------------------------------------------------------------------------
         <PF3>:EXIT
```

Fig. 13

SYSTEM AND METHOD FOR MONITORING COMPUTER APPLICATION AND RESOURCE UTILIZATION

CROSS REFERENCE TO RELATED APPLICATION

This application claims the benefit of a provisional U.S. application, U.S. Ser. No. 60/293,685, filed May 25, 2001, in the name of the present inventor.

FIELD OF THE INVENTION

This invention generally relates to monitoring of computer resource usage, and more particularly, to an application expense analysis system and method that allow computer usage to be gathered for various applications including non-batch applications. The present invention may be used, for example, for computer application/customer charge back, and capacity planning.

BACKGROUND OF THE INVENTION

A tool that facilitates computer monitoring has existed for quite some time, such as, for example, the IBM mainframe System Monitoring Facility (SMF) application. Using SMF, for example, resource usage is typically gathered by turning on a monitoring process which collects performance information for all activities on that system. At the end of the day, the records that have been captured are then analyzed and reported on via a batch process. This non-real time data collection is illustrated for example, in FIG. 1. In this prior approach, there is little flexibility in deciding what program is related to which application in a real time basis other than by creating batch reporting jobs at some later time, such as at the end of the day.

SUMMARY OF THE INVENTION

The present inventor recognizes that there are several disadvantages to the prior type of performance monitoring applications. First, significant amount of data need to be collected and produced. This is costly to system resources since a CPU is needed to process the data, as well as disk storage space to store the data. For sites with a high volume of activity, the total amount of CPU time and storage required might be so excessive that this monitoring cannot be used.

This tremendous need for computer resources is illustrated, for example, in FIG. 2 of the present invention. In FIG. 2, estimated numbers of data bytes required for collection and storage for a large, medium and small computer processing site using prior monitoring processes, are shown respectively in column 21, 22 and 23. For example, for a large processing site which runs about a maximum of 45,000 transactions daily, it is estimated that approximately 172.8 million bytes of performance collection data (45,000 transactions×160 bytes per transactions/hour×24 hours) need to be processed by CPU and stored in memory, as shown in item 24 of FIG. 2. Therefore, the computer resource drain using prior systems is fairly extensive.

Another drawback of prior systems is that performance results are not immediately apparent and cannot be accessed until the end-of-day when the reporting is completed, and then after all batch processing jobs have been run. This is an inherent problem in the non-real time nature of the prior systems.

Yet another disadvantage of prior systems is that it is difficult to modify the cost model being used for charge back or enhancement. That is, prior systems do not provide information on, for example, what program is associated with what application; or how each program is associated with each application; or which user of a particular customer is using the application or program.

Therefore, one function of present invention is to allow computer resource usage such as CPU and disk activity to be extrapolated across all applications that are sharing a particular computer resource. This helps to solve the problem of needing to identify users of an application so they can be charged for the appropriate costs.

Accordingly, the present invention collects and analyzes performance data in a significantly different manner than the prior systems and methods. For example, although the present invention may use the same collection points provided by an operating system of a computer, but instead of taking the performance data and writing it to disk for the batch process, it quickly categorizes the data in real time through a series of lists, and associates the performance data to a specific application. This results in several advantages not present in prior systems.

One advantage is that since performance collection is ongoing, current results can be accessed immediately. Another advantage is that by having levels of indirection (e.g., program tied to an application group, or known as a service for multiple application groups), the present invention allows easy modification as applications change or new ones are implemented. Yet another advantage is that the present invention allows total costs for collecting to be lessened. For example, by collecting and categorizing results online in real time, the present invention significantly reduce disk storage by not having to save every data record. This in turn results in less CPU time needed to process and report on the captured information.

Therefore, a system and a method for monitoring computer application and resource utilization are presented. In one exemplary embodiment, a list of different users associated with different entities or customers of a shared computer is maintained. A second list of different applications invoked by one or more of the different users is also maintained. A third list including different programs employed by the different applications invoked by the different users, including a weighting factor for each program is also maintained. These records are then used to identify operation usage and/or cost characteristics of the different applications by particular users associated with different entities of the shared computer, in response to an event.

In another exemplary embodiment according to principles of the present invention, a user interface system is described for monitoring individual application utilization of a plurality of concurrently operating applications shared by multiple users associated with one or more entities. A first image is displayed including a user selectable item for selecting display of image data representing processor utilization collated by individual application for a plurality of concurrently operating applications. In response to user selection of the item, a second image is displayed including compiled data identifying at least one of, (a) processor time used by an individual application, (b) a number of file accesses made by an individual application, and (c) a number of storage access requests made by an individual application of said plurality of concurrently operating applications.

BRIEF DESCRIPTION OF THE DRAWINGS

In the drawing:

FIG. 2 illustrates the estimated amount of data that are required for different sites using prior systems for collecting data.

FIGS. 4A and 4B illustrate exemplary lists that may be used in accordance with the present invention.

FIGS. 6A to 6E, and 7 to 15 show various user interface screens suitable for use with exemplary system and process according to the present invention.

DETAILED DESCRIPTION

The present invention provides an enhanced monitoring process for a computer system. One exemplary implementation of the present invention is Application Expense (APEX) analysis software, to determine application charge back for different customers or entities. An exemplary functional diagram of APEX is shown in FIG. 3.

One advantage of the present invention is the ability to track and associate a given program with a given computer application being invoked in a computer system. An application may be, for example, executable software code in hardwired logic or resident in volatile storage including one or more programs or procedures. An example of a computer application in this regard may be a patient management application for storing and retrieving patient information.

Figure 1:
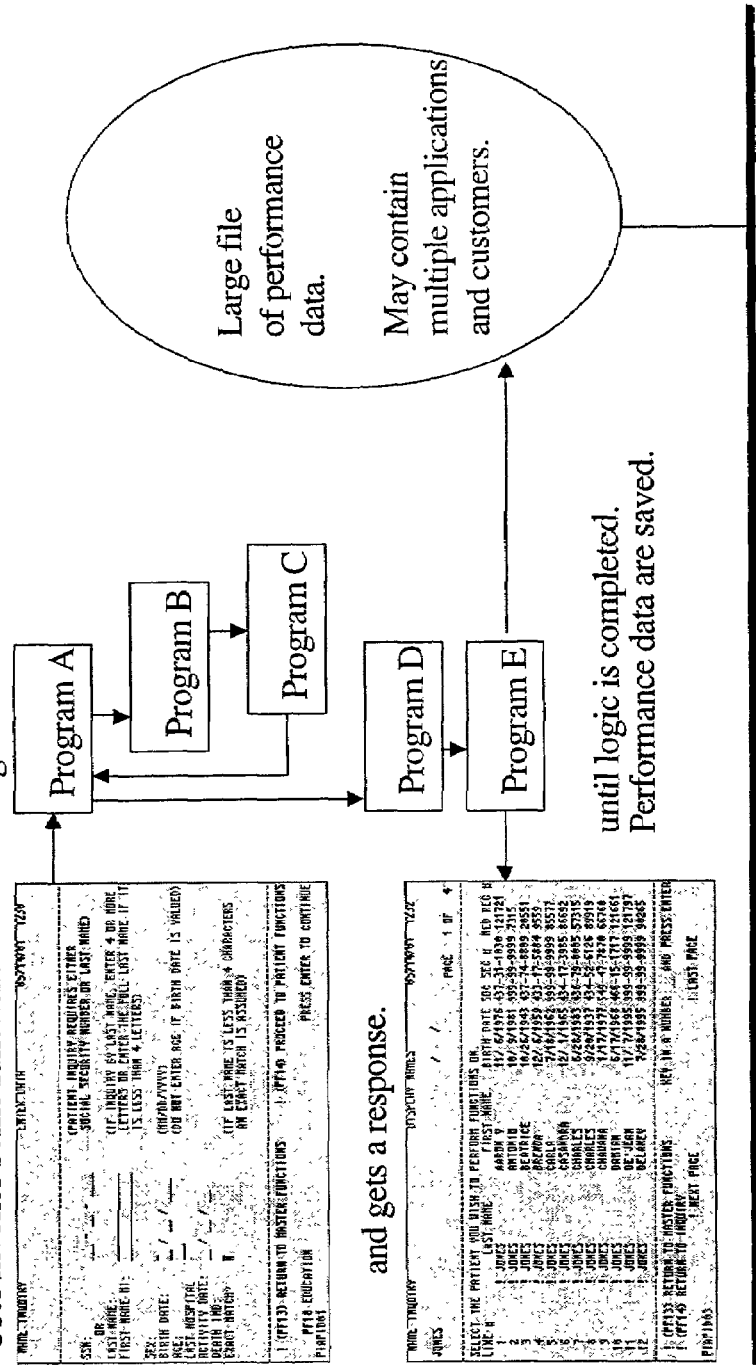
FIG. 1 illustrates how a prior system is used to collect performance data.
Figure 3:
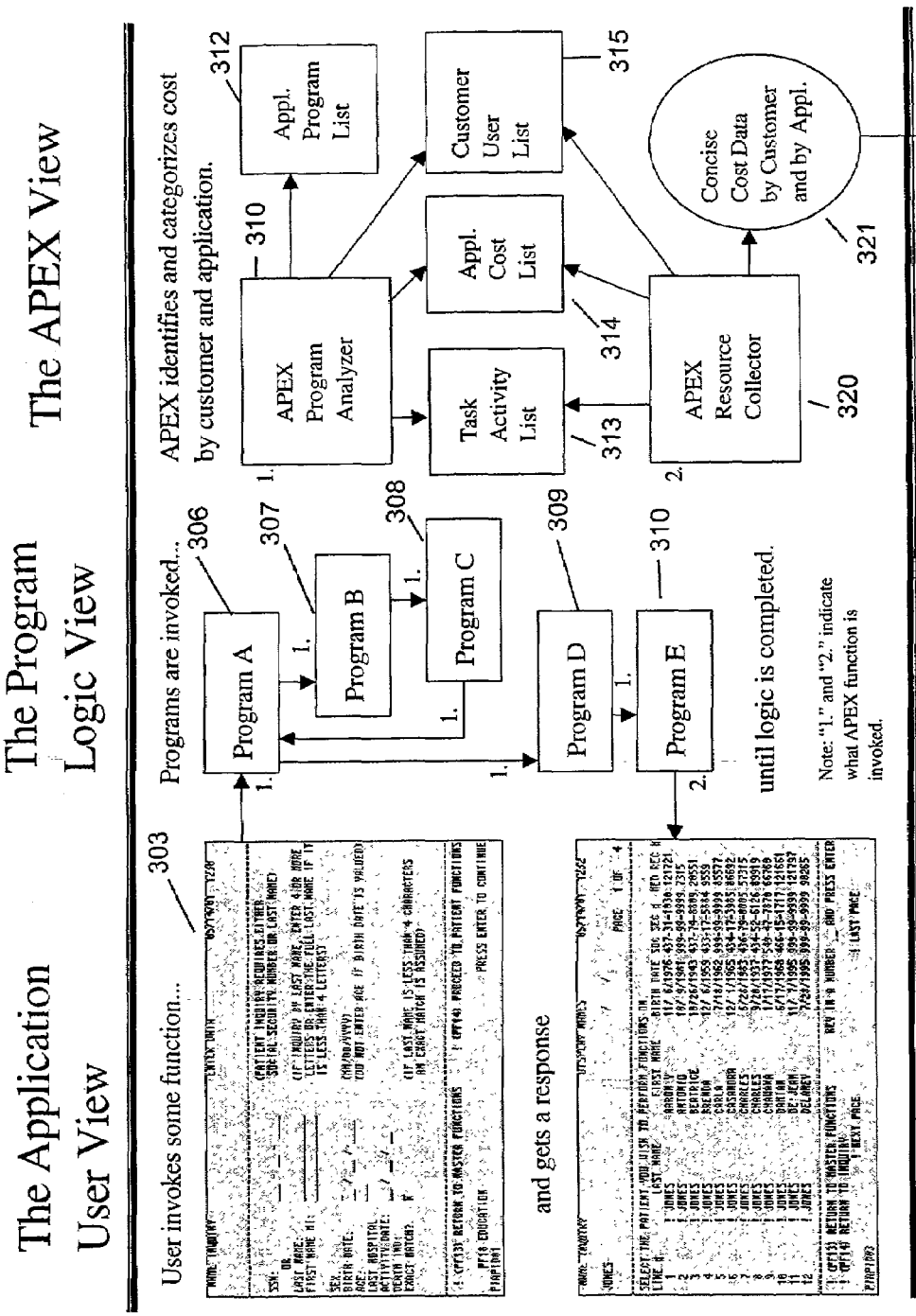
FIG. 3 illustrates exemplary system and method of data collection according to the principles of the present invention.

For example, a user may start a patient management application by invoking a patient inquiry screen 303 shown on FIG. 3. Once a patient management application such as request 303 is invoked, various programs associated with the particular application may be called to implement the user request 303. A program in this regard may comprise a program subroutine, a block of computer codes, or a service that is callable by the application being invoked. A program may be dedicated to a particular computer application or shared among many different applications. An example a program includes but is not limited to, for example, a subroutine, a calculation algorithm, a shared service such as a print service, or a paging display, etc.

As shown in FIG. 3, for example, once a user invokes an application 303, various programs 306-310 associated with the invoked application 303 may be called by the application 303, as needed. As these programs 306-310 are invoked, their use and association to a particular application are tracked by APEX, as shown in FIG. 3.

APEX monitoring process may comprise various sub-processes, as shown in FIG. 3. A first sub-process may be a program analyzer process 310, which creates, maintains and updates various records or lists (e.g., lists 312, 313, 314 and 315) for APEX. These various records or lists contain information to be used by APEX, such as, for example, what statistical data are to be collected, and how to collect them. Another sub-process, a resource collector process 320, collects and correlates various usage and statistical data from the various lists maintained by APEX and output the results for further processing by another sub-process 321 as shown in FIG. 3.

Figure 4A:
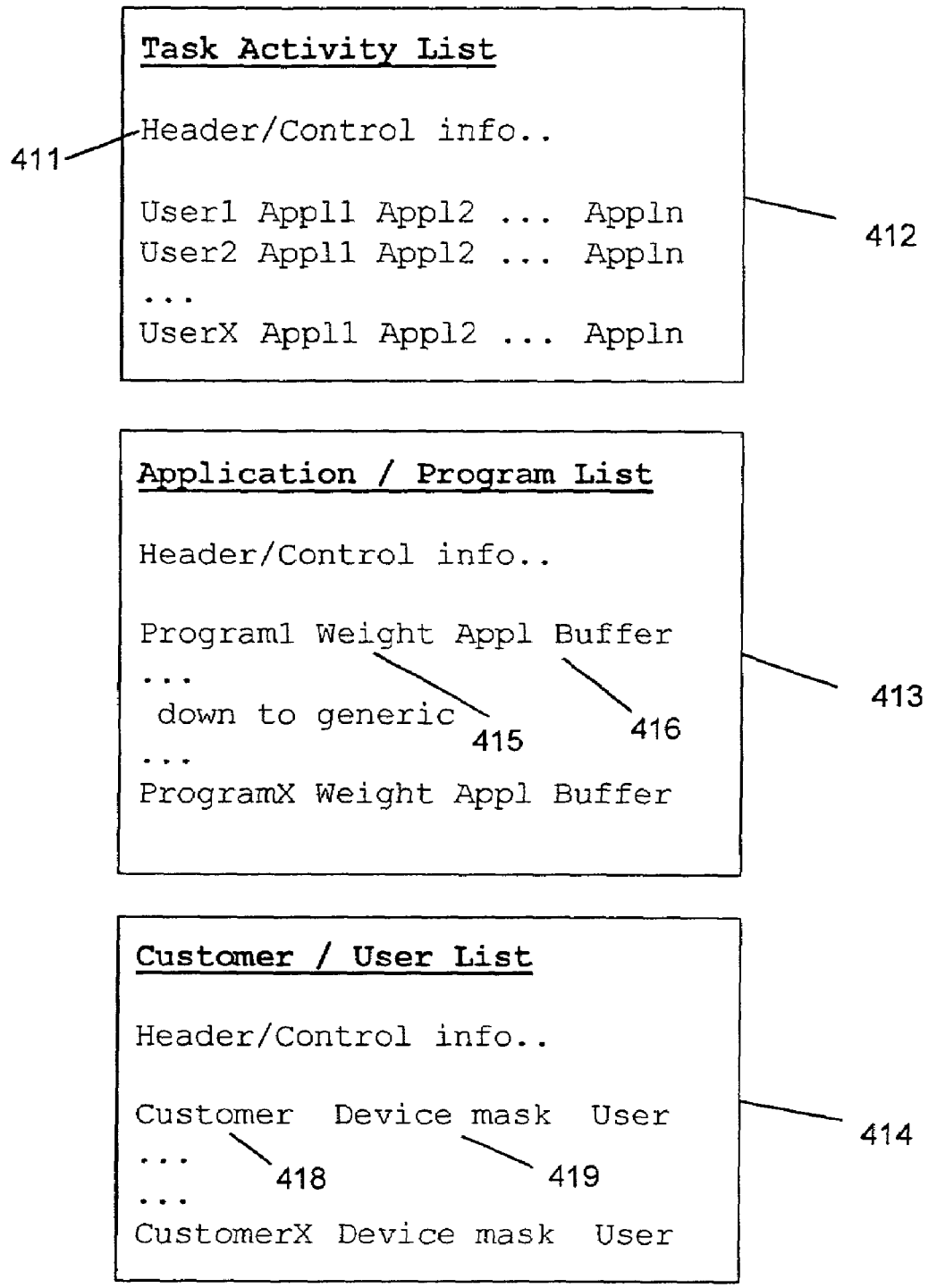

FIGS. 4A and 4B illustrate exemplary lists or records that may be used by APEX of the present invention. The term record is used herein to signify information or data that is material to a particular subject and that is preserved in non-volatile, permanent or tangible form such as in a computer file, disk, CDROM, DVD etc., or other electronic storage and is accessible by a computer or other electronic processing system.

Lists 412 to 414 shown in FIG. 4A may contain a header/control information field such as field 411 in List 412. Head/control information field 411 generally contains information about what a particular list is used for and access information such as, for example, linked list pointers for improving access performance of a list. For example, header/control information field 411 of Task Activity List (TAL) 412 may contain a pointer to indicate the most-recently or last accessed item in the list.

Besides header/control information field 411, List 412 comprises information about which user, among the shared users of a computer system, has invoked what applications in the system being monitored by APEX. That is, each row in List 412 indicates what applications (e.g., application 1 to application n) have been invoked by the particular user of the row (among users X of the system). Therefore, APEX is able to assign usage of each application to a particular user of a shared computer system, according to List 412.

Another list, Application/Program List (APL) 413 of FIG. 4A keeps track of which of the different programs have been called by which individual applications of the different applications listed in, for example, List 412. In another aspect of the present invention, each program in List 414 may include an associated "weight" factor, for example, weight factor 415 of FIG. 4A.

A weight factor 415 represents a prediction or an estimate of relative duration of use of a given program by individual applications of the different applications in a computer system. As stated before, a program may be dedicated to only one application or shared among many different applications. Therefore, in one exemplary embodiment, a weight factor may be a number from 1 to 1000, with 1 being the multiply for a program that is shared among many (such as 1000) different applications, and 1000 being a multiplier for a program dedicated to one application. Therefore, the use of a weight factor takes into account of how program resources or costs may be more fairly divided among the different applications in a given computer system. This allows more equitable and accurate customer charge back for computer resource usage, down to detailed program level.

In addition, Buffer field 416 of List 413 improves access time of Application/Program List 413. Buffer field 416 is used to indicate whether a particular row of data record is part of a memory access buffer tracked by Program Buffer Pool List 454 (PBPL) of FIG. 4B to be described below.

By keeping track of a user's association to different applications invoked and a program's association to different applications invoked, Application/Program List 412 in combination with Task Activity List 413, allow APEX to monitor usage and performance of a shared computer system efficiently. APEX is able to provide detailed and accurate usage and performance data with very little overhead.

FIG. 4 A shows another list, Customer/User List (CUL) 414, which is used to correlate different users and/or devices to different customers or entities that may have access to the system. A customer or an entity of a particular computer system is flexibly defined by APEX. For example, customer 418 shown in List 414 may comprise a company, a corporation, an organization or any other identifiable group of users.

List 414 of FIG. 4A is used to map a device and/or a user to a specific customer of a computer system being monitored by APEX. That is, List 414 is created so that for each customer, all devices and/or users belonging to the particular customer and having access to the computer system are included in this list. A device mask, for example, device mask 419, identifies a device in this list. Device mask 419 is an indicator or ID number identifying a particular device having access to the computer. An example of a device may be a workstation, a computer terminal or other I/O equipment.

Wildcard character function may be used in conjunction with device masks of List 414, so that a group of devices belonging to the same customer may have, for example, the same last 4 characters in order to simplify data input and/or retrieval. List 414, therefore, is able to identify user to customer association and aggregate usage of different users and/or devices on a particular computer system on a per customer basis.

An Application/Cost List (ACL) 451 of FIG. 4B is used to correlate computer resource usage to associated customer and application invoked. The first column 457 of List 451 shows the different applications (each of which is associated with a customer) that have been invoked by a computer system being monitored. For each application invoked, different "criteria stats" 458 and different "performance stats" 459 may be tracked.

Criteria stats 458 are used mainly for APEX self-tuning purposes. That is, for each customer/application being tracked, a system administrator may specify what statistics should be used to track the usage or performance of the customer/application. For example, an administrator may ask APEX to track how many or what user interface screens are generated during the duration of the application so that this information may be used to change weight factors associated with different programs as indicated in Application/Program List 416 of FIG. 4A. These criteria statistics, therefore, may be used to refine the future performance of APEX.

On the other hand, performance stats 459 are actual computer resource statistics that are monitored and used by APEX for, for example, usage charge back purposes. Examples of performance statistics comprise processor time used, number of file access requested, amount of memory (e.g., shared temporary storage) used, etc., for each application invoked.

Other example of records or lists which may be utilized by APEX include Report Generation List (RGL) 452, Application/Statistical Definition List (ASDL) 453, and Program Buffer Pool List (PBPL) 454, as shown in FIG. 4B. Report Generation List 452 contains links to different statistics captured in Application/Cost List 451 described previously. In addition, List 452 may contain information about output reporting criteria (e.g., hourly, daily) and the output mechanism (e.g., via file, SMF, etc.). RGL 452 may be used to correlate and output the collected statistical information based on the information contained in the list.

In addition, Application/Statistical Definition List 453 maps specific statistical reporting criteria to the actual data collection mechanism provided by a computer system being monitored. That is, List 453 translates statistical information provided by the computer system's native operating environment to the APEX specific environment.

Program Buffer Pool List (PBPL) 454 provides a Most-Recently-Used (MRU) pooling construct to keep Application Program List 413 searching to a minimum, as described before in relationship to the buffer field 416 in Application Program List 413. It may also contain other pointers to the Application Program List 413 and Task Activity List 414.

The various records and lists described above are merely exemplary only. They may be implemented in many different ways or forms. For examples, the lists may be created and maintained all in one location or computer file or in different computer files. Also, the lists may be combined or separated in many different ways. For example, Customer/User List 414 shown in FIG. 4A may be implemented via two separate lists, one list associating different users with different customers or entities and another list associating different devices with different users. These two lists may then be used in combination by APEX to identify and track application usage of all the devices and users for a particular customer of the system being monitored.

Figure 5A:
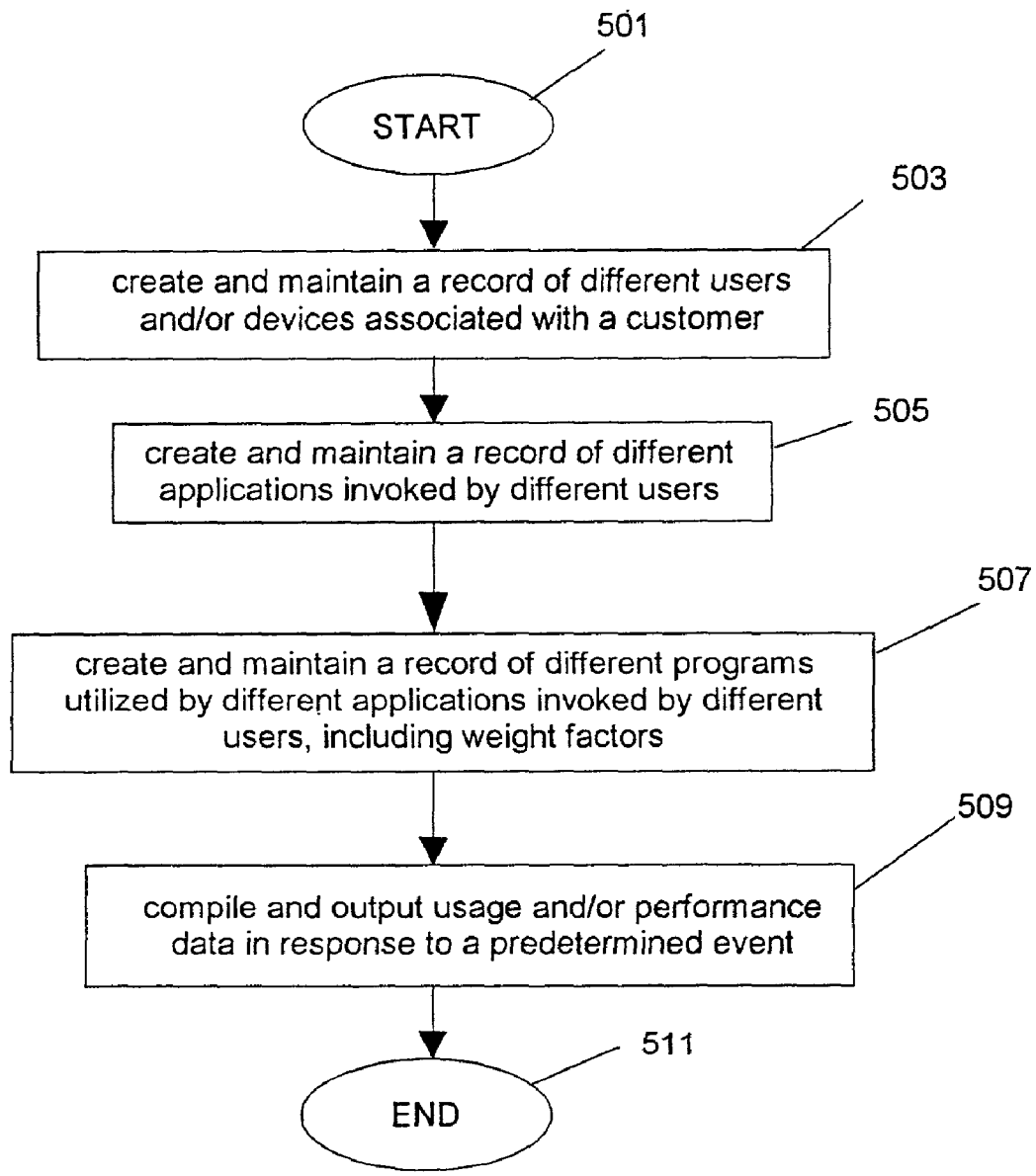
FIG. 5A is a flow diagram of a monitoring process according to the present invention.

FIG. 5A shows a flow chart of a monitoring process according to the present invention. At step 503, APEX may dynamically create and maintain a record of different users and/or devices associated with one or more entities or customers of a computer system being monitored. An example of this record may be, for example, Customer/User List 414 shown in FIG. 4A and discussed previously.

At step 505, APEX may dynamically create and maintain a second record. This record may contain association of different applications invoked by each of the different users on the computer system. An example of this record may be Task Activity List 412 as shown in FIG. 4A and discussed above. List 412 keeps track of which users have invoked what applications.

At step 507, APEX may also dynamically create and maintain a third record. This record may contain association of different executable programs employed by the different applications. An example of this record may be Application Program List 413, shown in FIG. 4A. As discussed before, Application Program List 413 includes a program weight factor for each program being tracked. The use of weight factors supports allocation of proportionate usage of the different programs among the different applications of the system being monitored.

At step 509, APEX in response to a predetermined event, may comply data based on these records, to identify operation usage characteristics of each customer of the shared computer systems, including usage by all the users belonging to a particular customer. The compilation of data may be accomplished by, for example, an APEX resource collector sub-process 320 as shown in FIG. 3, and/or subsequent processes such as process 321 to better analyze and format different collected information. A predetermined event may comprise, and is not limited to an event such as a data access request; a storage access request; termination of use of an individual application; termination of a user operation session; or a periodically generated command.

Figure 5B:
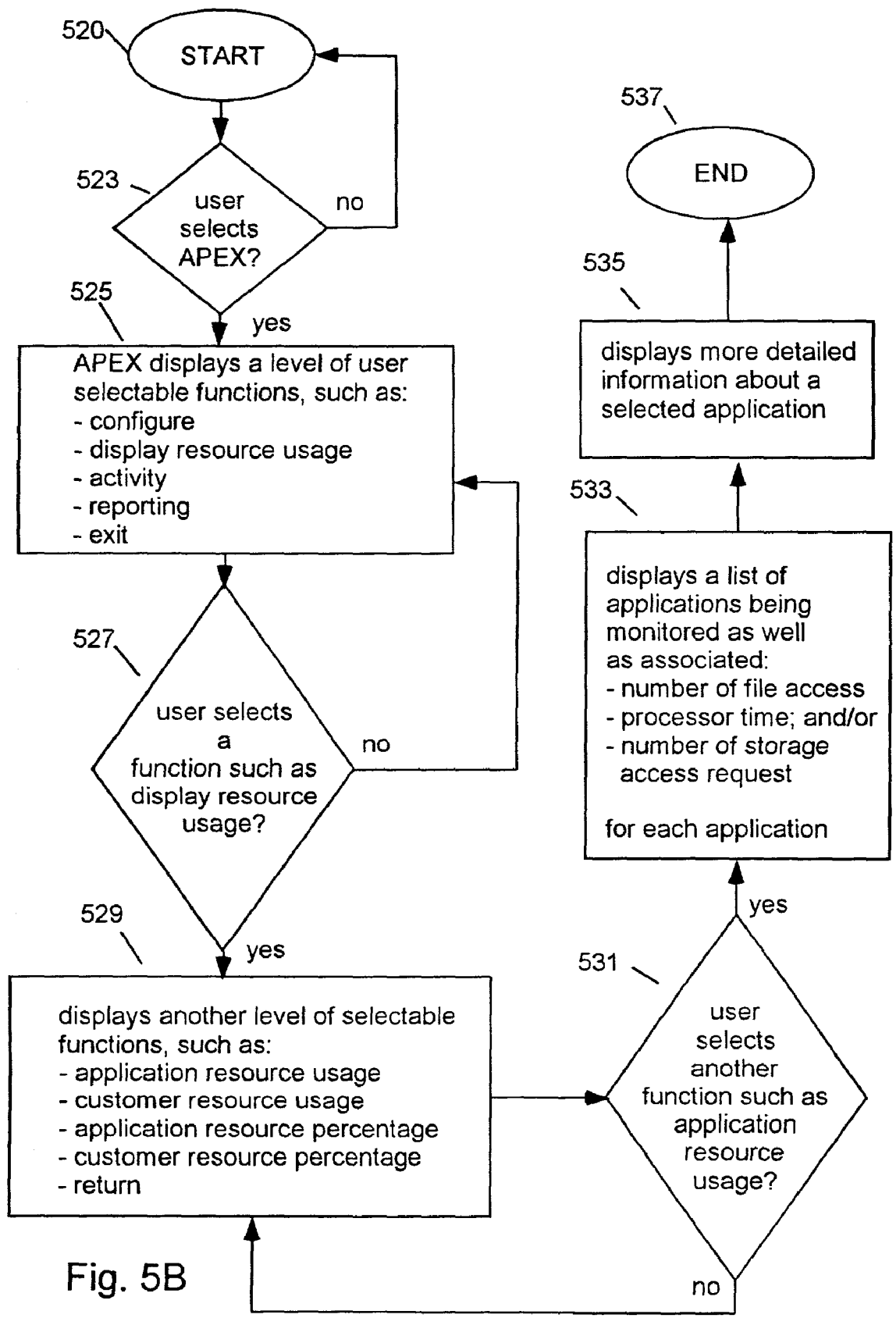
FIG. 5B shows another flow diagram of the present invention.
Figure 6A:
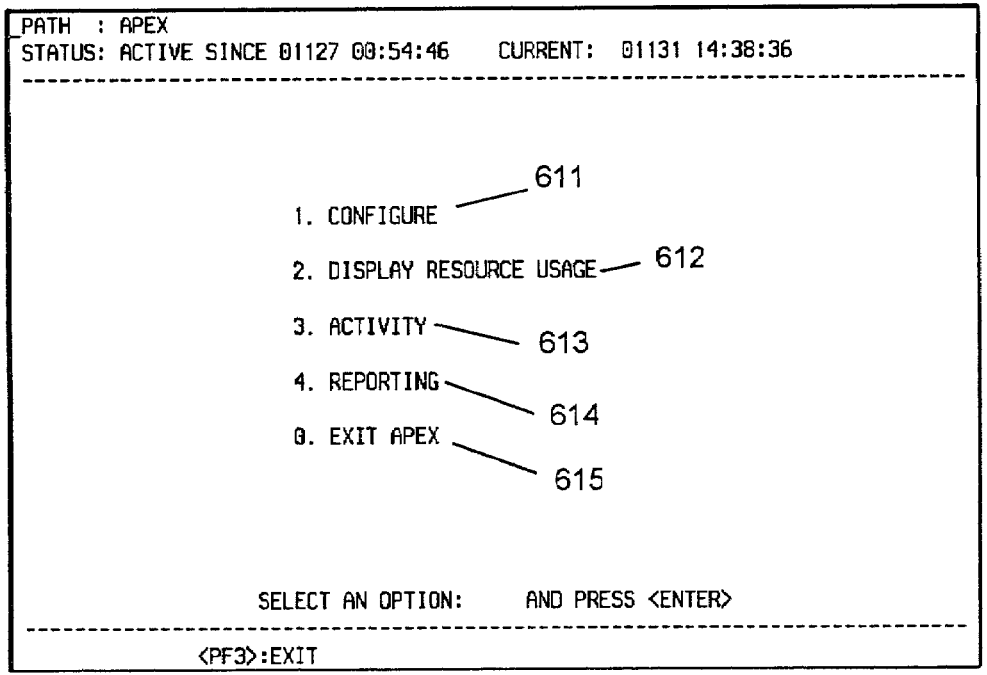

FIG. 5B shows another flow chart of APEX according to the present invention. As mentioned before, one advantage of the present invention is to allow a user of APEX to easily obtain resource usage information, without having to wait for the end-of-day batch processing. Accordingly, in response to a user requesting APEX at step 523 of FIG. 5B, an exemplary user interface screen 610, as shown in FIG. 6A, is presented to the user by APEX, at step 525. Screen 610 displays a first level of user selectable functions 611-615 under APEX for user interaction, as shown in FIG. 6A.

At step 527 of FIG. 5B, a user may then select, for example, function 612 "DISPLAY RESOURCE USAGE", of FIG. 6A. At step 529, APEX, in response to this user selection, presents to the user another level of selectable functions 621 to 625 under the display resource usage option category, as shown on screen 620 of FIG. 6B.

Figure 6B:
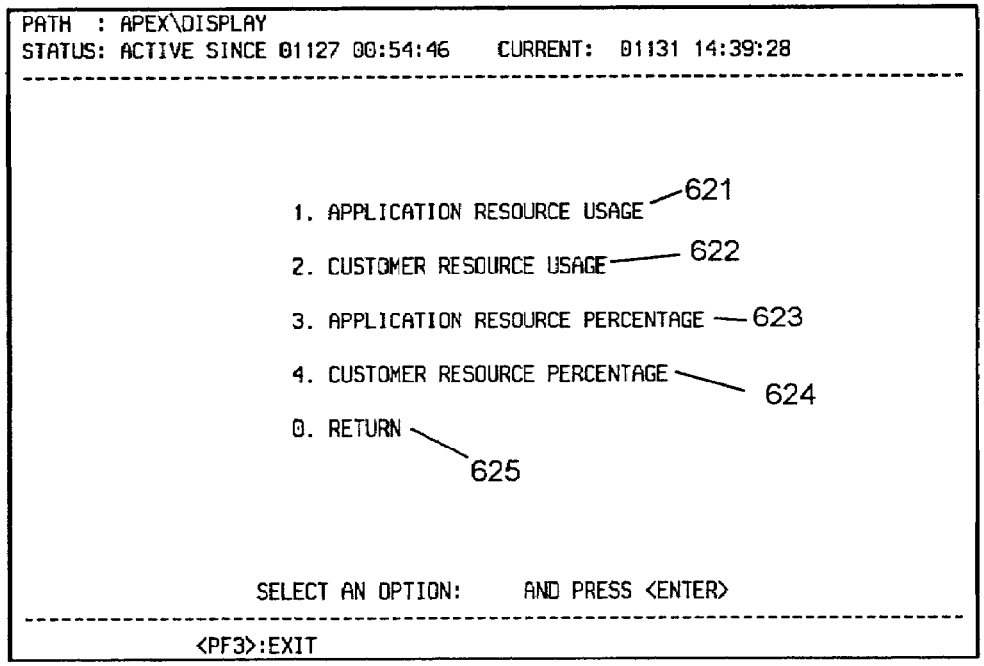

At step 531, a user may then select, for example, option 621 "application resource usage", shown on screen 620 of FIG. 6B. This option corresponds to a selection of data representing processor utilization collated by individual application for a plurality of concurrently operating applications. At step 533, once this option 621 is selected, another screen 630 shown in FIG. 6C, will be displayed. Screen 630 comprises a list of applications 631 being tracked by APEX. For each application, APEX may display, for example, processor time used by each associated application within a certain time period, as shown in column 632 of FIG. 6C. APEX also displays total number of file access requests made by each associated application during a time period, as shown in column 633 of FIG. 6C. In addition, APEX display on the same screens 630, a total number of temporary storage (e.g., RAM) access requests 634 made by each application.

Furthermore, at step 535, a user may scroll up and down the list of applications shown in column 631 of screen 630 and selects a particular application to obtain even more detailed statistical information regarding the selected application. For example, FIG. 6E shows exemplary detailed usage and performance information a user may obtain for an application under APEX. These detailed information, may include for example, total number of file read requests 651, and write requests 652, etc.

In addition, FIG. 6D shows screen 640 having application usage information expressed in percentage terms. This screen 640 will be displayed, for example, in response to a user selecting "APPLICATION RESOURCE PERCENTAGE" option 623, shown on screen 620 of FIG. 6B.

Figure 14:
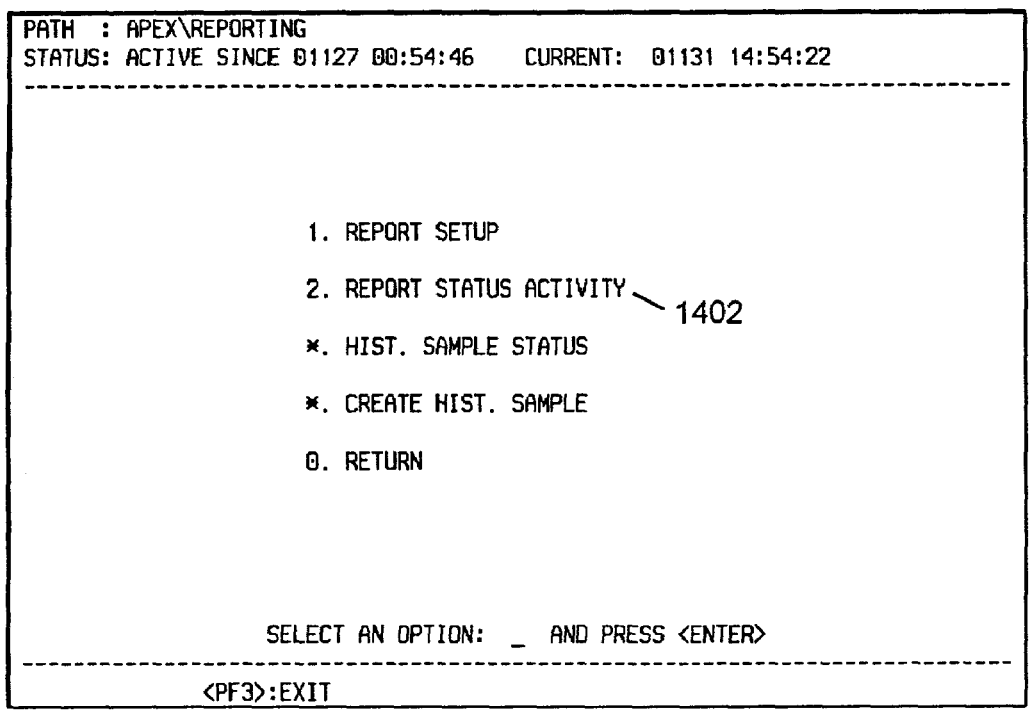
Figure 15:
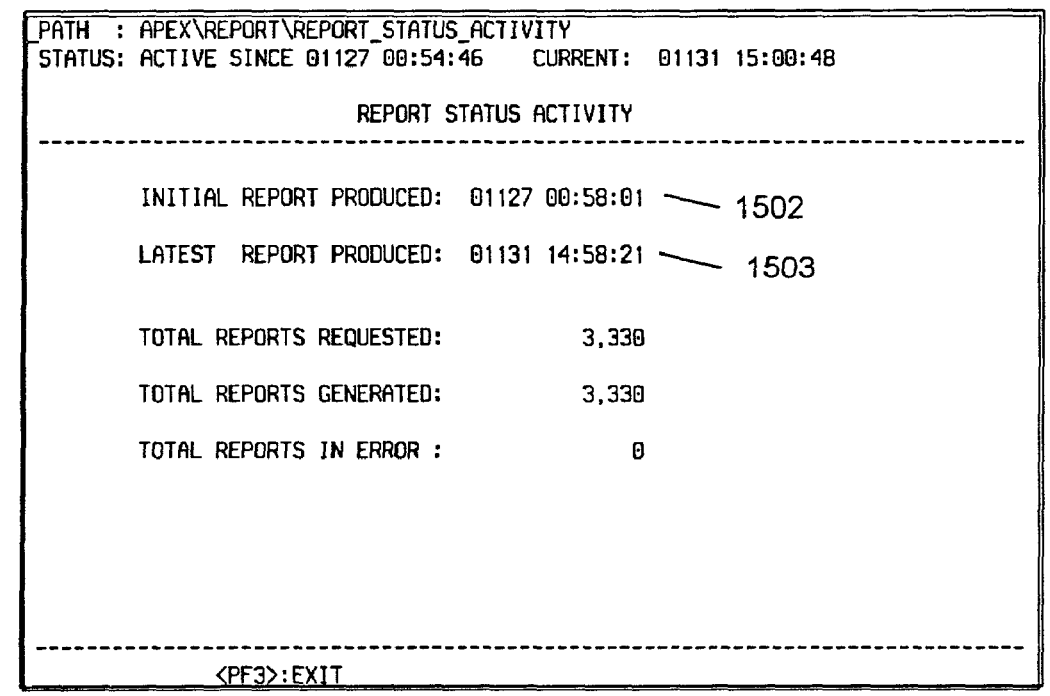

FIGS. 7 to 15 shows other user interface screens according to principles of the present invention. For example, FIG. 14 shows a user interface screen 1401 comprising various options including setup and statistics options for different user reports under APEX. For example, if a user selects option 1402 "REPORT STATUS ACTIVITY" under user screen 1401, APEX may display more detailed information regarding different reports that have been generated in a given time period. For example, APEX may display, within a given time period, the production time of the first report 1502 and the production time of the last report 1503, as shown on screen 1501 of FIG. 15.

It is to be understood that the embodiments and variations shown and described herein are for illustrations only and that various modifications may be implemented by those skilled in the art without departing from the scope of the invention.

What is claimed is:

1. In a system supporting shared access to a plurality of concurrently operating applications by multiple users associated with one or more entities, a method performed by a data processor for monitoring individual application utilization, said method comprising the steps of:

maintaining a first record of different users associated with an entity;

maintaining a second record of different applications invoked by at least one of said different users;

maintaining a third record of use of an executable program employed by said different applications invoked by said at least one of said different users, said third record supporting allocation of proportion of usage of said executable program by individual applications of said different applications, said allocation being performed by determining an estimate of relative duration of use of said executable program by individual applications of said different applications; and employing said first, second and third records for intermittently compiling data identifying operation usage characteristics of individual applications of said different applications by said at least one of said different users associated with said entity in response to a predetermined processing operation event.

2. A method according to claim 1, including the step of determining and recording weighting factors associated with individual applications of said different applications, said weighting factors representing an estimate of relative duration of use of said executable program by individual applications of said different applications.

3. A method according to claim 1, wherein said step of intermittently compiling data comprises intermittently compiling data identifying at least one of,
   (a) processor time used by an individual application,
   (b) a number of file accesses made by an individual application, and (c) a number of storage access requests made by an individual application.

4. A method according to claim 3, wherein said step of intermittently compiling data comprises intermittently compiling data supporting identifying relative operation usage characteristics by an individual application as a proportion of said different applications.

5. A method according to claim 1, wherein said predetermined processing operational event comprises at least one of, (a) a data access request, (b) a storage access request, (c) termination of use of an individual application, (d) termination of a user operation session and (e) a periodically generated command.

6. A method according to claim 1, including the step of maintaining a fourth record associating a processing device with at least one of, (a) a user, (b) an entity and (c) an individual application.

7. A method according to claim 1, wherein said second and third records include data elements and said data elements of said second and third records are dynamically created during a session of operation.

8. A method according to claim 1, wherein said executable program employed by said different applications comprises a program providing a function shared by said different applications.

9. A method according to claim 1, wherein said entity comprises at least one of, (a) a customer, (b) a company, (c) an organization and (d) an identifiable group of users.

10. In a system supporting shared access to a plurality of concurrently operating applications by multiple users associated with one or more entities, a method performed by a data processor for monitoring individual application utilization, said method comprising the steps of:

during a session of user operation, maintaining a first record of different users associated with an entity;

maintaining a second record of different applications invoked by at least one of said different users;

maintaining a third record associating a processing device with said at least one of said different users;

maintaining a fourth record of use of an executable program employed by said different applications invoked by said at least one of said different users in allocating proportion of usage of said executable program between said different applications, said allocating being performed by determining an estimate of relative duration of use of said executable program by individual applications of said different applications; and employing said first, second, third and fourth records for intermittently compiling data identifying at least one of, (a) processor time used by an individual application, (b) a number of file accesses made by an individual application, and (c) a number of storage access requests made by an individual application of said different applications by said at least one of said different users associated with said entity in response to a predetermined processing operation event.

11. A method according to claim 10, wherein said step of maintaining a third record includes maintaining a third record associating said processing device with said entity.

12. A method according to claim 10, wherein said first, second and third records are maintained in at least one of, (a) a single file and (b) a plurality of files.

13. A method according to claim 10, wherein said step of intermittently compiling data comprises intermittently compiling data identifying at least one of, (a) size of storage employed by an individual application, (b) a number of input/output requests made by an individual application and (c) a number of file deletion requests made by an individual application.

14. In a system supporting shared access to a plurality of concurrently operating applications by multiple users associated with one or more entities, a method performed by a data processor for monitoring application utilization, said method comprising the steps of:

maintaining a first record of different users associated with an entity;

maintaining a second record of different applications invoked by at least one of said different users;

maintaining a third record associating a processing device with said at least one of said different users;

maintaining a fourth record of use of an executable program employed by said different applications invoked by said at least one of said different users in allocating proportion of usage of said executable program between said different applications, said allocating being performed by determining an estimate of relative duration of use of said executable program by individual applications of said different applications;

employing said first, second, third, and fourth records for intermittently compiling data identifying at least one of, (a) processor time used by an individual application, (b) a number of file accesses made by an individual application, and (c) a number of storage access requests made by an individual application of said different applications by particular users associated with said entity in response to a predetermined processing operation event; and generating a record based on said compiled data.

15. A method according to claim 14, wherein said step of generating a record comprises generating a record for use in adaptively adjusting system characteristics to improve system performance.

16. In a user interface system for monitoring individual application utilization of a plurality of concurrently operating applications shared by multiple users associated with one or more entities, a method performed by a data processor comprising the steps of:

initiating display of a first image including a user selectable item for selecting display of image data representing processor utilization collated by individual application for a plurality of concurrently operating applications;

in response to user selection of said item, initiating display of a second image including compiled data identifying at least one of, (a) processor time used by an individual application, (b) a number of file accesses made by an individual application, and (c) a number of storage access requests made by an individual application of said plurality of concurrently operating applications;

deriving said compiled data by intermittently generating data identifying operation usage characteristics of individual applications of said plurality of concurrently operating applications based on accumulated operation data records, said operation usage characteristics being collated for individual users associated with an entity; and allocating proportion of usage of an executable program between said plurality of concurrently operating applications by determining an estimate of relative duration of use of said executable program by individual applications of said plurality of concurrently operating applications.

17. A system for monitoring individual application utilization of a plurality of concurrently operating applications shared by multiple users associated with one or more entities, comprising:

a record processor for, maintaining a first record of different users associated with an entity, maintaining a second record of different applications invoked by at least one of said different users, and maintaining a third record of use of an executable program employed by said different applications invoked by said at least one of said different users, said third record supporting allocation of proportion of usage of said executable program by individual applications of said different applications, said allocation being performed by determining an estimate of relative duration of use of said executable program by individual applications of said different applications; and a data compiler employing said first, second and third records for intermittently compiling data identifying operation usage characteristics of individual applications of said different applications by said at least one of said different users associated with said entity in response to a predetermined processing operation event.

18. A system for monitoring individual application utilization of a plurality of concurrently operating applications shared by multiple users associated with one or more entities, comprising:

a record processor for, maintaining a first record of different users associated with an entity, maintaining a second record of different applications invoked by at least one of said different users, maintaining a third record associating a processing device with said at least one of said different users and maintaining a fourth record of use of an executable program employed by said different applications invoked by said at least one of said different users in allocating program of usage of said executable program between said different applications, said allocating being performed by determining an estimate of relative duration of use of said executable program by individual applications of said different applications; and a data compiler employing said first, second, third, and fourth records for intermittently compiling data identifying at least one of, (a) processor time used by an individual application, (b) a number of file accesses made by an individual application, and (c) a number of storage access requests made by an individual application of said different applications by said at least one of said different users associated with said entity in response to a predetermined processing operation event.

* * * * *